(12) United States Patent
Kanehara

(10) Patent No.: US 6,611,873 B1
(45) Date of Patent: Aug. 26, 2003

(54) ADDRESS-BASED SERVICE REQUEST DISTRIBUTING METHOD AND ADDRESS CONVERTER

(75) Inventor: Fumikazu Kanehara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/444,375

(22) Filed: Nov. 22, 1999

(30) Foreign Application Priority Data

Nov. 24, 1998 (JP) .......................................... 10-332121

(51) Int. Cl.[7] .......................................... G06F 15/173
(52) U.S. Cl. ...................... 709/238; 709/200; 709/203; 709/217; 709/219; 709/224; 709/242; 709/245; 709/105; 707/10; 707/204
(58) Field of Search ................................. 709/200–203, 709/217–219, 223–224, 231–233, 236, 238, 242–243, 245, 105; 707/10, 200–204

(56) References Cited

U.S. PATENT DOCUMENTS

| | | | | |
|---|---|---|---|---|
| 5,474,819 A | * | 12/1995 | Millar et al. ................ | 709/203 |
| 5,694,547 A | * | 12/1997 | Subramanian et al. ....... | 709/224 |
| 5,815,662 A | * | 9/1998 | Ong ............................ | 709/202 |
| 6,081,836 A | * | 6/2000 | Karapetkov et al. ........ | 709/218 |
| 6,138,144 A | * | 10/2000 | Desimone et al. .......... | 709/204 |
| 6,173,312 B1 | * | 1/2001 | Atarashi et al. ............. | 709/203 |
| 6,226,684 B1 | * | 5/2001 | Sung et al. .................. | 709/238 |
| 6,304,908 B1 | * | 10/2001 | Kalajan ....................... | 709/229 |
| 6,332,157 B1 | * | 12/2001 | Mighdoll et al. ........... | 709/217 |
| 6,374,300 B2 | * | 4/2002 | Masters ....................... | 709/229 |
| 6,446,108 B1 | * | 9/2002 | Rosenberg et al. ......... | 709/203 |

FOREIGN PATENT DOCUMENTS

| | | | | |
|---|---|---|---|---|
| JP | 9-218842 A | 8/1997 | | |
| JP | 10-124412 | 5/1998 | .......... | G06F/13/00 |
| JP | 10-198642 A | 7/1998 | | |

* cited by examiner

Primary Examiner—Bharat Barot
(74) Attorney, Agent, or Firm—Sughrue Mion, PLLC

(57) ABSTRACT

A method for distributing service requests to a plurality of servers without any need for preparing a special measure in the clients or performing session management is disclosed. Addresses of a plurality of clients are classified in advance into a plurality of address groups. Each of the plurality of address groups is correlated with one of a plurality of servers. A service request of a client is distributed to a corresponding server depending on which address group the client belongs to.

17 Claims, 7 Drawing Sheets

FIG. 3

207 ADDRESS CONVERSION TABLE

| CLIENT NETWORK ADDRESS | NET MASK | SERVER IP ADDRESS | PORT NO. | CONVERTED MAC ADDRESS | CONVERTED IP ADDRESS |
|---|---|---|---|---|---|
| 192.168.65.0 | FFFFFF00 | 192.168.64.1 | 80 | 10:20:30:40:50:60 | 192.168.64.2 |
| 192.168.66.0 | FFFFFF00 | 192.168.64.1 | 80 | 70:80:90:A0:B0:C0 | 192.168.64.3 |
| 192.168.65.0 | FFFFFF00 | 192.168.64.1 | 20 | 10:20:30:40:50:60 | 192.168.64.2 |
| 192.168.66.0 | FFFFFF00 | 192.168.64.1 | 20 | 70:80:90:A0:B0:C0 | 192.168.64.3 |

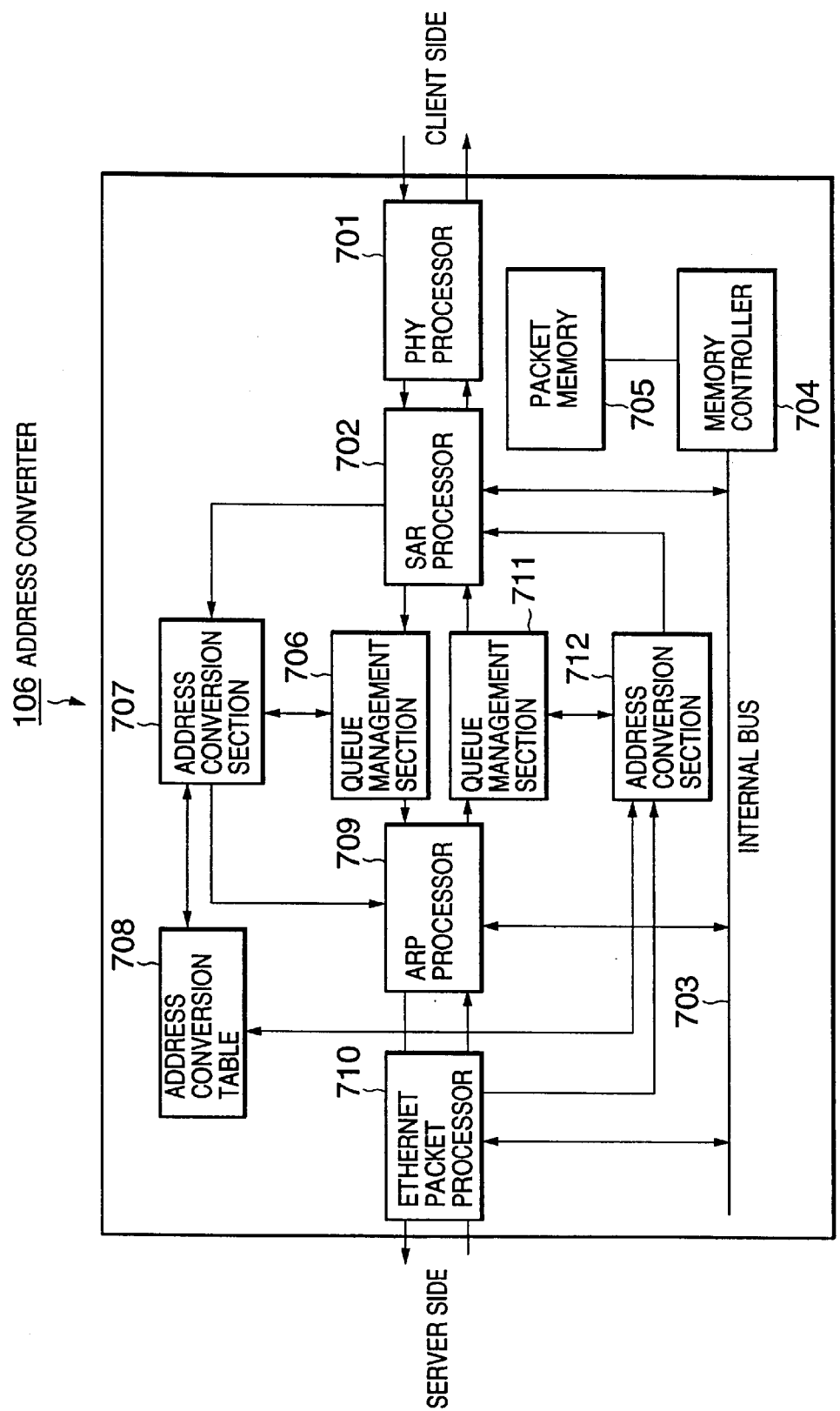

ADDRESS-BASED SERVICE REQUEST DISTRIBUTING METHOD AND ADDRESS CONVERTER

BACKGROUND OF THE INVENTION

1. Field of the Invention

The present invention relates to a technique of dispersing the load of a server by distributing requests of clients to a plurality of servers.

2. Description of the Prior Art

In recent years, network infrastructures such as ATM (Asynchronous Transfer Mode) networks and gigabit Ethernets have been established increasingly and the communication capacity has increased. Also in in-house LANs (Local Area Networks), appropriate networks have been prepared and the speed of client-server communication has been increased. However, increases in communication speed and bandwidth increase the number of processing requests from clients to a server, resulting in the increased processing load of the server.

In the above circumstances, various techniques for dispersing the load of a server have been proposed. For example, Japanese Patent Laid-Open No. 10-124412 discloses a method in which clients monitor the load status of a server. Specifically, each client of a client/server system directly performs data transfer by controlling an I/O device of the server. Each client estimates a network load based on a data read time, and controls the size of a data field for one transfer and the waiting time during one data transfer in accordance with a network load estimation result. The load of the server is decreased in this manner.

As exemplified by LocalDirector™ of CISCO SYSTEMS Inc. and Equalizer™ of COYOTE POINT SYSTEMS Inc., another method is known in which TCP (Transmission Control Protocol) sessions are managed and requests from clients are distributed to a plurality of servers on a session-by-session basis.

However, the technique in which clients monitor the load of a server is low in extendability because a dedicated measure needs to be prepared in the clients. The method in which requests from clients are distributed to a plurality of servers on a session-by-session basis does not necessarily utilize the bandwidth of a network efficiently because managing sessions causes a considerable load in itself.

SUMMARY OF THE INVENTION

An object of the present invention is to provide a method and apparatus for distributing requests of clients to a plurality of servers without any need for preparing a special measure in the clients or performing session management.

According to an aspect of the present invention, a method for distributing service requests includes the steps of: classifying, in advance, addresses of a plurality of clients into a plurality of address groups; correlating each of the plurality of address groups with one of a plurality of servers; and sending a service request of a client to a corresponding server depending on which address group the client belongs to.

An address converter according to the invention includes an address conversion table in which a plurality of address groups and addresses of a plurality of servers are stored so as to be correlated with each other, respectively, the plurality of address groups having been generated in advance as a result of classification of addresses of a plurality of clients; and a controller distributing a service request of a client to a corresponding server by referring to the address conversion table, and for providing a requested service to the client.

The addresses of clients are classified in advance and address conversion is performed for each classification item. This makes it possible to distribute requests of clients to a plurality of servers and to disperse the load of each server without the need for performing session management or preparing a special measure in the clients. Further, since it is not necessary to perform session management or prepare a special measure in the clients, the process and the implementation are made easier and hence hardware can be constructed more easily. The processing speed can be made so much higher.

According to another aspect of the present invention, a method includes the steps of: classifying, in advance, addresses of a plurality of clients into a plurality of address groups; correlating each of the plurality of address groups, a kind of service, and one of a plurality of servers with each other; and sending a service request of a client to a corresponding server depending on an address group to which the client belongs and a kind of service that is requested by the client.

An address converter includes an address conversion table in which a plurality of address groups, kinds of service, and addresses of a plurality of servers are stored so as to be correlated with each other, respectively, the plurality of address groups having been generated in advance as a result of classification of addresses of a plurality of clients; and a controller distributing a service request of a client to a corresponding server by referring to the address conversion table, and for providing a requested service to the client.

The invention can be applied to a case where servers perform different services rather than a single service is distributed to a plurality of servers. This enables an operation in which it appears to a client as if one server is performing all services. As a result, in altering or extending the configuration of servers, it is not necessary to change the settings of clients. This makes it very easy to alter or extend a server system.

BRIEF DESCRIPTION OF THE DRAWINGS

FIG. 3 schematically shows an example of information that is held by an address conversion table 207;

FIG. 7 shows a configuration of the address conversion apparatus according to a second embodiment of the invention.

DETAILED OF THE PREFERRED EMBODIMENTS

Figure 1:
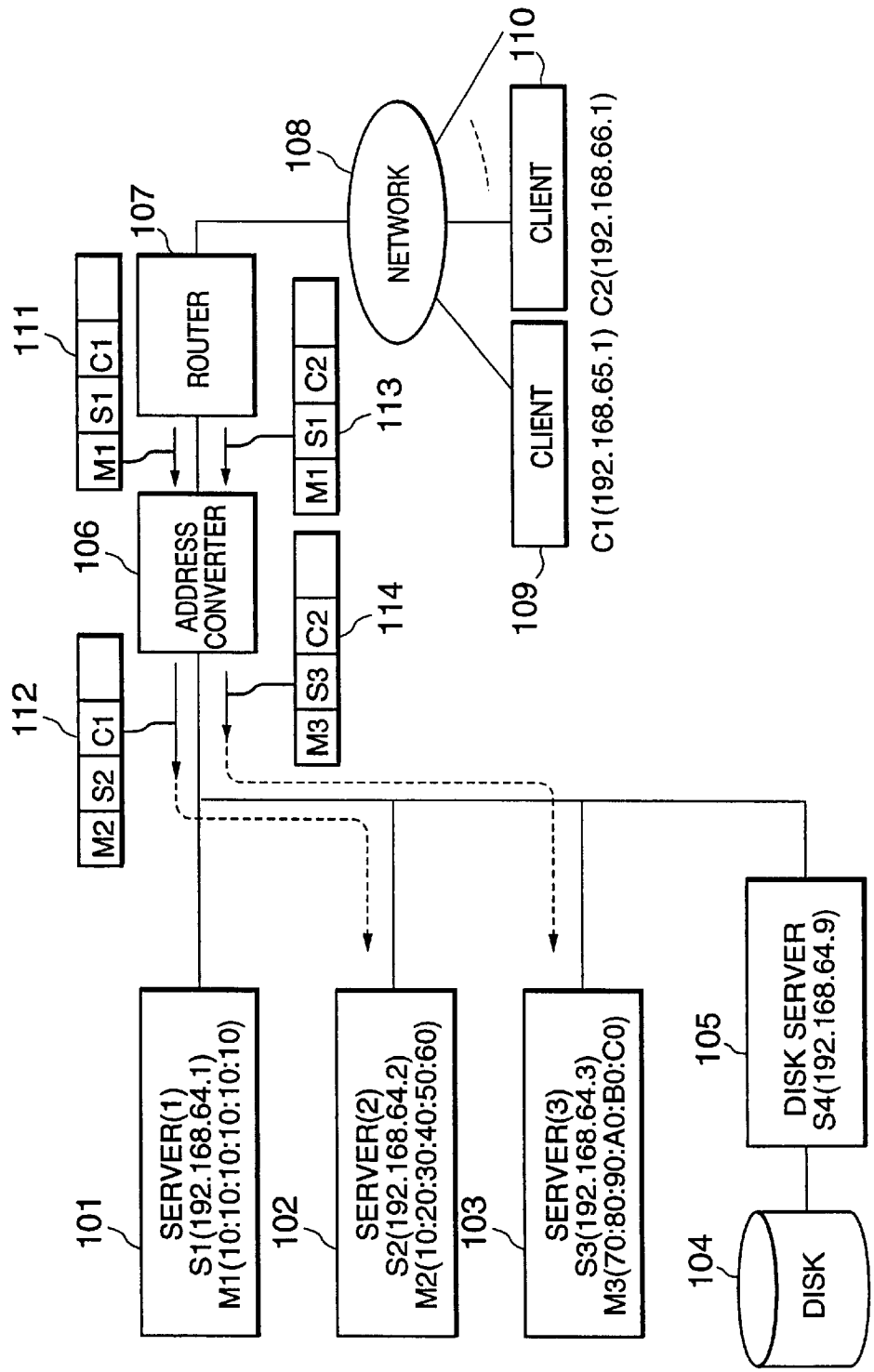
FIG. 1 is a block diagram showing an exemplary system using an address conversion apparatus that is an embodiment of a server load dispersion apparatus according to the present invention.

FIG. 1 is a block diagram showing an exemplary system using an address conversion apparatus that is an embodiment of a server load dispersion system according to the present invention. In this system, three servers 101–103 and a disk server 105 that is connected to a disk 104 are connected to a router 107 via an address converter 106. The router 107 is connected to a network 108. A plurality of clients can access the servers via the network 108.

Having an IP (Internet Protocol) address and a MAC (Media Access Control) address, each server accepts requests from many clients and provides a service using TCP (Transmission Control Protocol)/UDP (User Datagram Protocol). It is assumed that the server 101 has an IP address 192.168.64.1 and a MAC address 10:10:10:10:10:10, the server 102 has an IP address 192.168.64.2 and a MAC address 10:20:30:40:50:60, the server 103 has an IP address 192.168.64.3 and a MAC address 70:80:90:A0:B0:C0. Only the IP address of the server 101 is opened to the client side.

The disk server 105 manages, in a unified manner, data that are processed by the servers 101–103. It is assumed that each server provides a WWW (World Wide Web) service using HTTP (Hypertext Transfer Protocol) and that each server provides the same service.

The address converter 106 monitors packets coming from the router 107 and the server side and converts, if necessary, the IP address and the MAC address in a packet. As described later in detail, the address converter 106 classifies, in advance, the network addresses of many clients and performs address conversion so that the clients are connected to servers that are different for respective classification items. Specifically, assuming a case in which servers perform the same service, the address converter 106 is set in such a manner that, to reduce the load of the server 101, requests that come from partial clients (e.g., clients belonging to a particular subnet) and relate to the service are processed by the server 102. In this case, when receiving a packet having a port number of TCP/UDP that is assigned to the service, the address converter 106 converts its destination IP address and MAC address into the addresses of the server 102 and then sends out it to the server 102.

More specifically, when receiving a connection request 111 from a client network 109 having an address C1, the address converter 106 generates a connection request 112 for connection to the server 102 by converting its destination MAC address M1 and IP address S1 into the MAC address M2 and the IP address S2 of the server 102. Therefore, the service request from the client network 109 is processed by the server 102.

When receiving a connection request 113 from a client network 110 having a network address C2, the address converter 106 generates a connection request 114 for connection to the server 103 by converting its destination MAC address M1 and IP address S1 into the MAC address M3 and the IP address S3 of the server 103. Therefore, the service request from the client network 110 is processed by the server 103.

Figure 2:
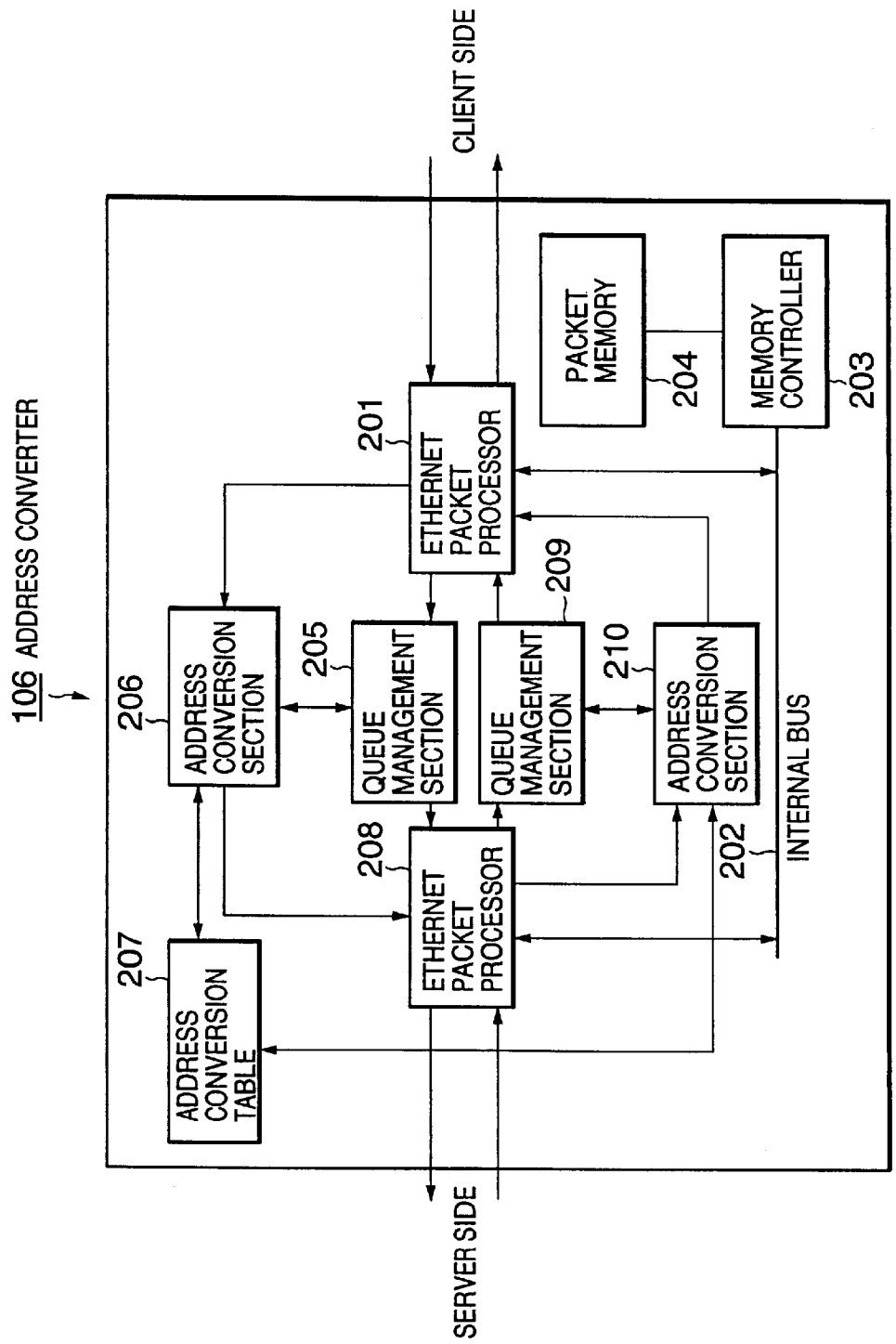
FIG. 2 is a block diagram of the address conversion apparatus according to a first embodiment of the invention.

FIG. 2 is a block diagram of the address converter 106 according to a first embodiment of the invention. It is assumed that the component devices of the system are connected to each other via an Ethernet.

An Ethernet packet according to IEEE 802.3 that is input from the client side is received and terminated by an Ethernet packet processor 201. The Ethernet packet processor 201 analyzes the Ethernet packet, and transfers its data to a packet memory 204 via an internal bus 202 and a memory controller 203 and has the data stored in the packet memory 204. Further, the Ethernet packet processor 201 sends information for control to a queue management section 205. Then, the Ethernet packet processor 201 sends a control signal indicating the end of storage to an address conversion section 206. The memory controller 203 controls packet reading and writing from and to the packet memory 204 in accordance with a read/write request.

When receiving a control signal from the Ethernet packet processor 201, the address conversion section 206 performs address conversion on a packet that is input from the client side based on information of an address conversion table 207 and information of the queue management section 205. After completing the address conversion, the address conversion section 206 sends a transmission request to an Ethernet packet processor 208.

The address conversion table 207 is a register that holds address conversion information that is set by a network manager in advance. The queue management section 205 manages packet data that are input from the client side and stored in this device, and provides information to the address conversion section 206.

When receiving a transmission request from the address conversion section 206, the Ethernet packet processor 208 generates an Ethernet packet based on information that is read out from the queue management section 205 and information that is read out from the packet memory 204 via the internal bus 202 and the memory controller 203, and sends the generated Ethernet packet to the server side.

On the other hand, an Ethernet packet according to IEEE 802.3 that is input from the server side is received and terminated by the Ethernet packet processor 208. The Ethernet packet processor 208 analyzes the received Ethernet packet, and transfers its data to the packet memory 204 via the internal bus 202 and the memory controller 203 and has the data stored in the packet memory 204. Further, the Ethernet packet processor 201 sends information for control to a queue management section 209. Then, the Ethernet packet processor 208 sends a control signal indicating the end of storage to an address conversion section 210.

When receiving a control signal from the Ethernet packet processor 208, the address conversion section 210 performs address conversion on a packet that is input from the server side based on information of the address conversion table 207 and information of the queue management section 209. After completing the address conversion, the address conversion section 210 sends a transmission request to the Ethernet packet processor 201. The queue management section 209 manages packet data that are input from the server side and stored in this device, and provides information to the address conversion section 210.

When receiving a transmission request from the address conversion section 210, the Ethernet packet processor 201 generates an Ethernet packet based on information that is read out from the queue management section 209 and information that is read out from the packet memory 204 via the internal bus 202 and the memory controller 203, and sends the generated Ethernet packet to the client side.

FIG. 3 schematically shows an example of information that is held by the address conversion table 207. For example, the entry contents of the first row of the address conversion table 207 show address conversion that should be performed when the client network 109 having the network address 192.168.65.0 receives a service corresponding to a port number 80, and the entry contents of the second row show address conversion that should be performed when the client network 110 having the network address 192.168.66.0 receives the service corresponding to the same port number 80. The entry contents of the third row of the address conversion table 207 show address conversion that should be performed when the client network 109 receives a service corresponding to a port number 20, and the entry contents of the fourth row show address conversion that should be performed when the client network 110 receives the service corresponding to the same port number 20.

For example, in the case of a client belonging to the client network having the subnet address 192.168.65.0 that is indicated by a net mask FFFFFF00h (the last character "h" means hexadecimal representation), an Ethernet packet that is input to the address converter 106 has, as data, an IP packet having, in addition to the source IP address of the client, the destination address that is the IP address 192.168.64.1 of the server 101 and the port number 80. As for this Ethernet packet, the destination MAC address is converted into the MAC address 10:20:30:40:50:60 of the server 102 and the destination IP address is converted into the IP address 192.168.64.2 of the server 102. Therefore, this Ethernet packet will obtain the service corresponding to the port number 80 of the server 102. The same thing applies to a case where the same client requests the service corresponding to another port number 20.

Where the servers 101–103 provide the same service, the above-described address conversion makes it possible to allocate service requests in accordance with the addresses of clients, respectively, to thereby reduce the load of each server. Even where servers provide different services, by performing similar address conversion that takes port numbers into consideration, an operation is enabled in which it appears to a client as if one server (in this example, the server 101) is performing all services. In other words, in altering or extending the configuration of servers, it is not necessary to change the settings of clients.

Figure 4:
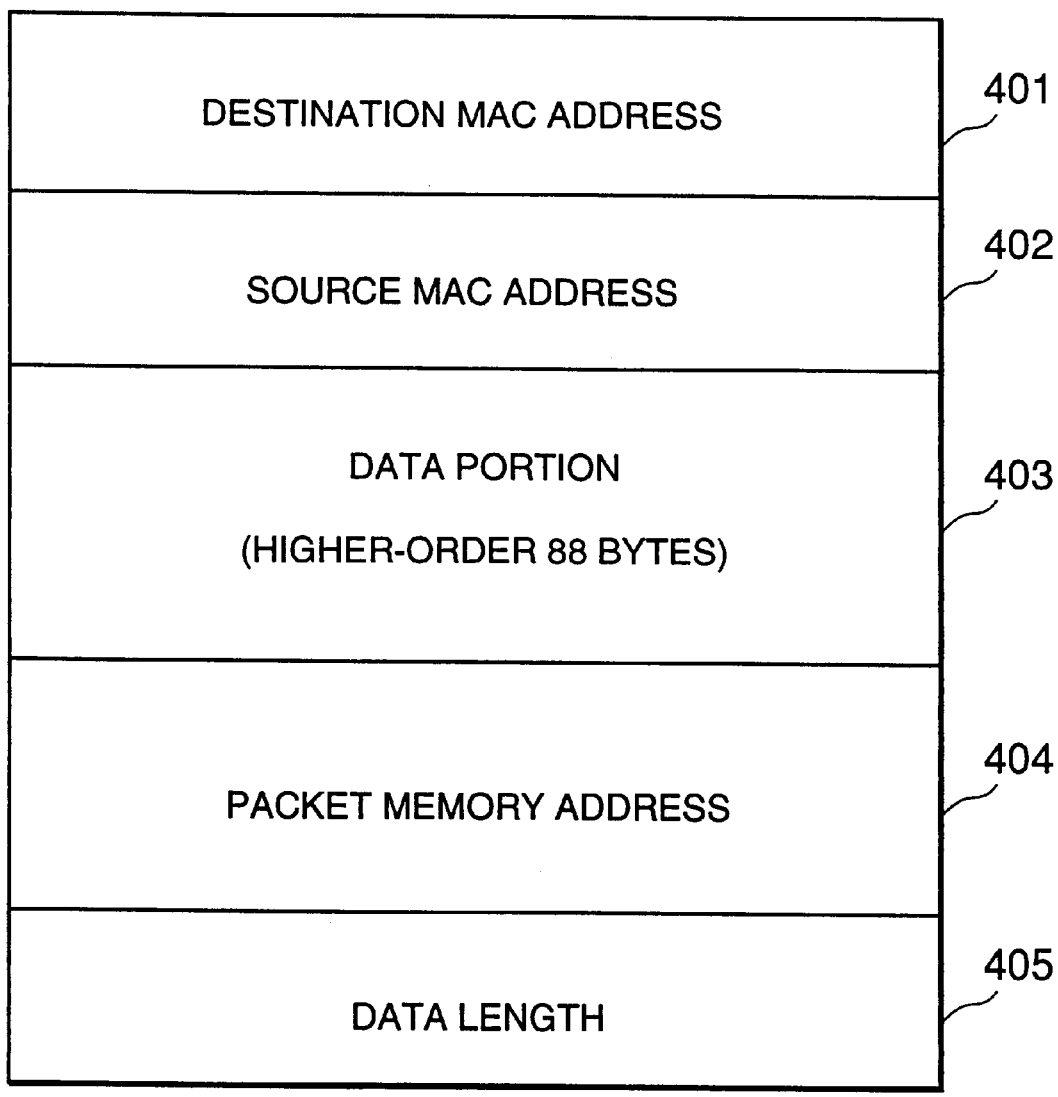
FIG. 4 schematically shows information that constitutes a queue that is stored in a queue management section 205 or 209.

FIG. 4 schematically shows information that constitutes a queue that is stored in the queue management section 205 or 209. A destination MAC address 401 and a source MAC address 402 are information in a received Ethernet packet. A data portion 403 of 88 bytes is information to be used for address conversion. A packet memory address 404 and a data length 405 indicate a location on the packet memory 204 where the data portion of the Ethernet packet is stored.

Next, the operation of the address converter shown in FIG. 2 will be described in further detail with reference to FIGS. 5 and 6.

Processing of packet received from client side

As described above, an Ethernet packet that is input from the client side is received and terminated by the Ethernet packet processor 201. The Ethernet packet processor 201 analyzes the Ethernet packet, extracts its destination MAC address, source MAC address, and data portion, and transfers the destination MAC address and the source MAC address to the queue management section 205. Then, the Ethernet packet processor 201 transfers the data portion to the packet memory 204 via the internal bus 202 and the memory controller 203 and has it stored in the packet memory 204. At this time, the first 88 bytes of the data portion (see FIG. 4) are transferred to the queue management section 205 at the same time as they are transferred to the internal bus 202.

After completion of the transfer of one packet to the packet memory 204, the Ethernet packet processor 201 transfers, to the queue management section 205, the packet memory address 404 that indicates the storage start position of the data that has been stored in the packet memory 204 and its data length 405 to the queue management section 205, and sends the address conversion section 206 a control signal indicating the end of storage. When receiving the control signal, the address conversion section 206 performs address conversion on the address information, stored in the queue management section 205, of the packet that has been input from the client side with reference to the address conversion table 206.

The operation of the address conversion section 206 will be described below with reference to a flowchart of FIG. 5.

Figure 5:
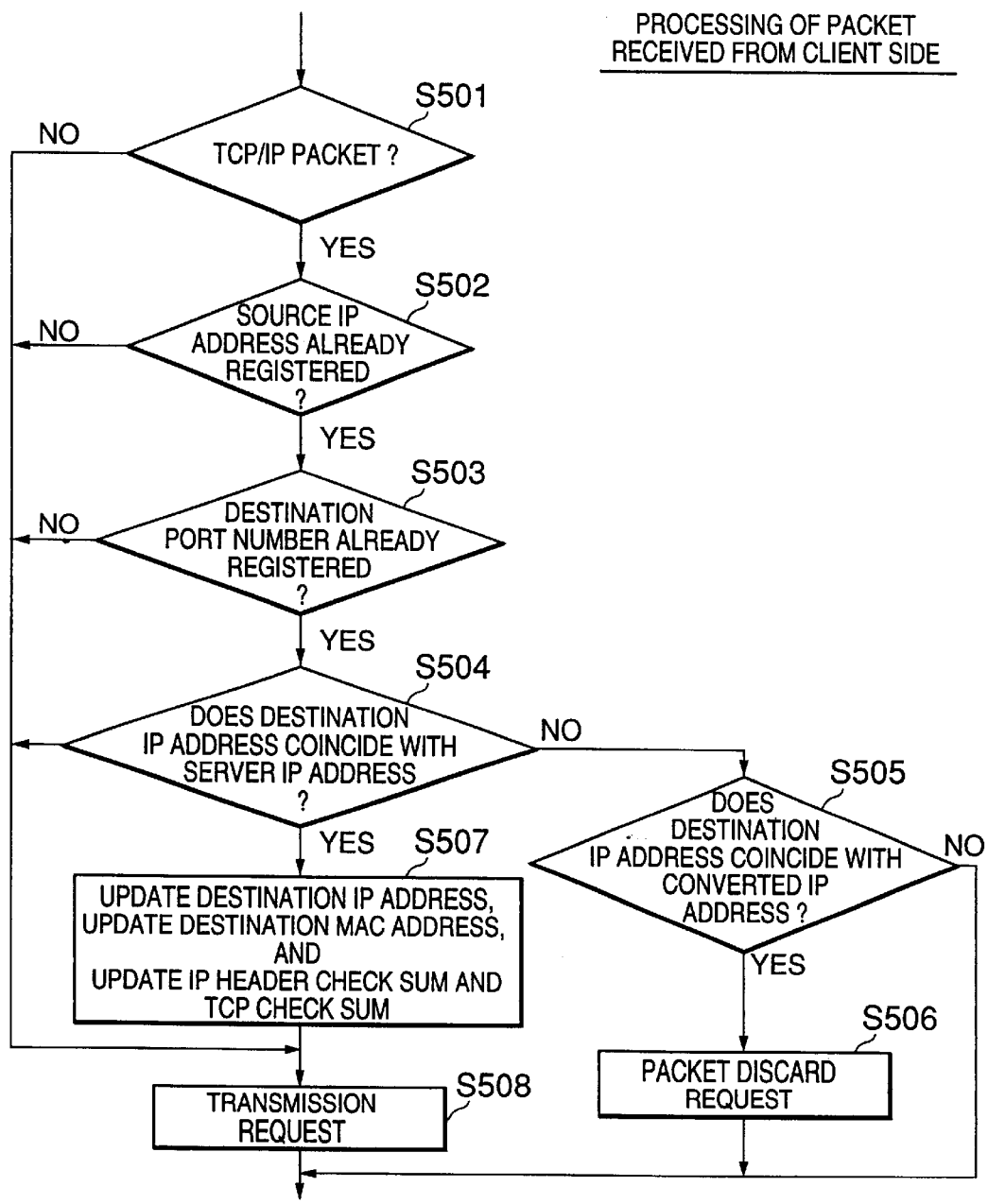
FIG. 5 is a flowchart showing the operation of an address conversion section 206 in a process that is executed on a packet that is input from the client side.

Referring to FIG. 5, first, the address conversion section 206 analyzes the data portion 403 and checks whether the packet is a TCP/IP packet (step S501). If the packet is not a TCP/IP packet (NO at step S501), the address conversion section 206 sends out a transmission request (step S508). If the packet is a TCP/IP packet (YES at step S501), the address conversion section 206 extracts the source IP address, the destination IP address, and the destination port number from the data section 403. First, the address conversion section 206 checks whether the source IP address is an address belonging to a subnet that is indicated by a client network address and a net mask in the address conversion table 207 (step S502).

If there is no entry corresponding to the source IP address (NO at step S502), the address conversion section 206 sends out a transmission request (S508). If there exists such an entry (YES at step S502), the address conversion section 206 checks whether the destination port number coincides with the port number in the entry (step S503). If the destination port number does not coincide with the port number in the entry (NO at step S503), the address conversion section 206 sends out a transmission request (S508). If the destination port number coincides with the port number (YES at step S503), the address conversion section 206 checks whether the destination IP address coincides with the server IP address (step S504).

If the destination IP address does not coincide with the server IP address (NO at step S504), the address conversion section 206 further checks whether the destination IP address coincides with the converted IP address in the address conversion table 201 (step S505). If coincidence is found (YES at step S505), the address conversion section 206 sends a discard request for the packet to the Ethernet packet processor 208 (step S506). This is to interrupt a packet having, as a destination address, an unpublicized server IP address for the port number as a subject of address conversion.

If the destination IP address coincides with the converted IP address (YES at step S504), the address conversion section 206 rewrites the information that is held by the queue management section 205. Specifically, the address conversion section 206 updates the destination IP address to the converted IP address in the entry and updates the destination MAC address 401 to the converted MAC address. Further, the address conversion section 206 updates an IP header check sum value and a TCP header check sum value in the data portion 403 (step S507). Finally, the address conversion section 206 sends a transmission request to the Ethernet packet processor 208 (step S508).

When receiving the transmission request, the Ethernet packet processor 208 reads the destination MAC address 401 and the data portion 403 from the queue management section 205, constructs an Ethernet packet, and transmits it to the server side. The Ethernet packet processor 208 reads the remaining part of the data portion (the 89th and following bytes) from the packet memory 204 via the internal bus 202 and the memory controller 203, and sends it out.

Processing of packet received from server side

An Ethernet packet that is input from the server side is received and terminated by the Ethernet packet processor 208. The Ethernet packet processor 208 analyzes the Ethernet packet, extracts its destination MAC address, source MAC address, and data portion, and transfers the destination MAC address and the source MAC address to the queue management section 209. Then, the Ethernet packet processor 208 transfers the data portion to the packet memory 204 via the internal bus 202 and the memory controller 203 and has it stored in the packet memory 204. At this time, the first 88 bytes of the data portion are transferred to the queue management section 209 at the same time as they are transferred to the internal bus 202.

After completion of the transfer of one packet to the packet memory 204, the Ethernet packet processor 208 transfers, to the queue management section 209, the packet memory address 404 that indicates the storage start position of the data that has been stored in the packet memory 204 and its data length 405 to the queue management section 205, and sends the address conversion section 210 a control signal indicating the end of storage. When receiving the control signal, the address conversion section 210 performs address conversion on the address information, stored in the queue management section 209, of the packet that has been input from the server side.

The operation of the address conversion section 210 will be described below with reference to a flowchart of FIG. 6.

Figure 6:
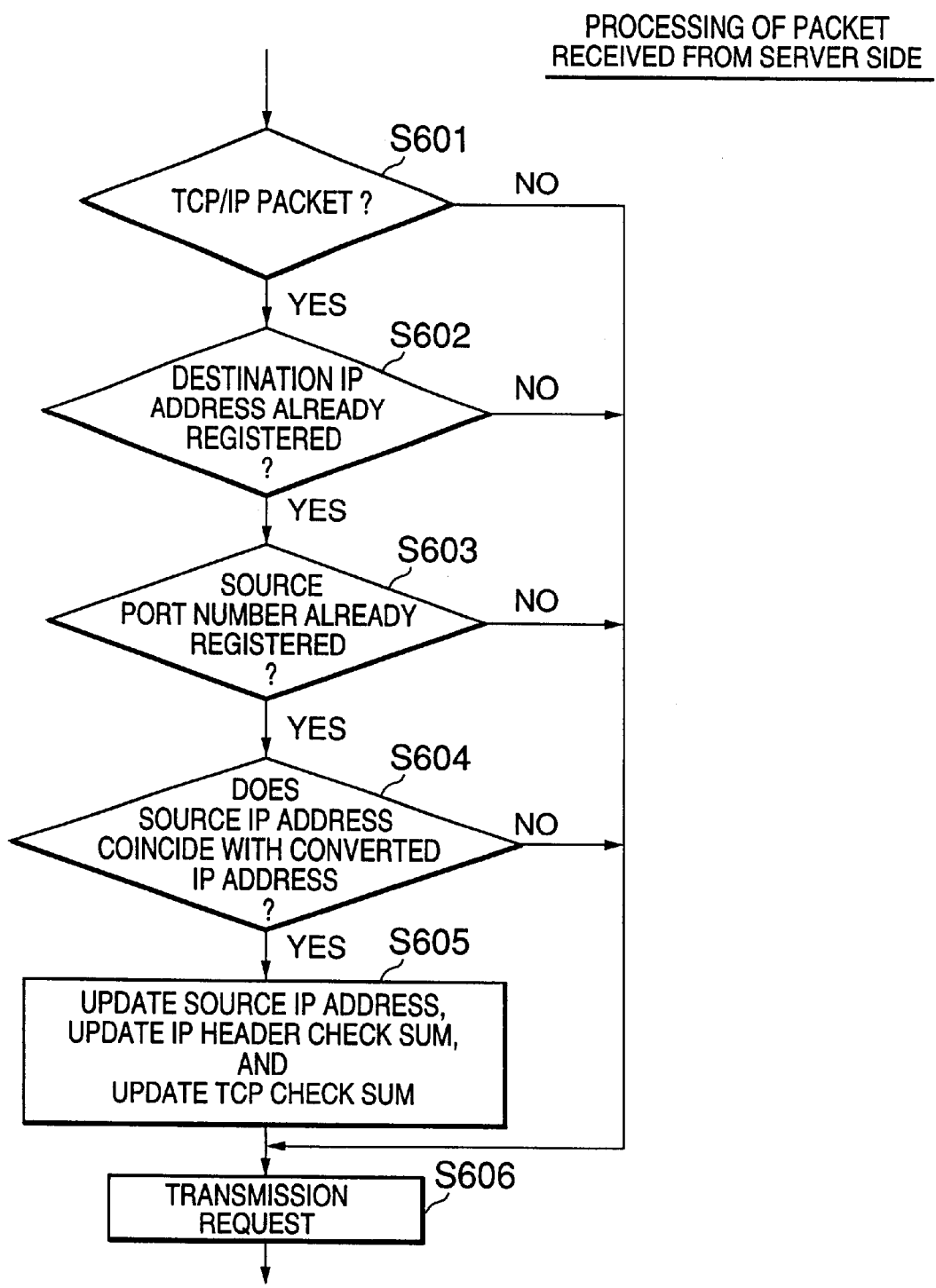
FIG. 6 is a flowchart showing the operation of the address conversion section 206 in a process that is executed on a packet that is input from the server side.

Referring to FIG. 6, first, the address conversion section 210 analyzes the data portion 403 and checks whether the packet is a TCP/IP packet (step S601). If the packet is not a TCP/IP packet (NO at step S601), the address conversion section 210 sends out a transmission request (step S606). If the packet is a TCP/IP packet (YES at step S601), the address conversion section 210 extracts the source IP address, the destination IP address, and the destination port number from the data section 403. First, the address conversion section 210 checks whether the destination IP address is an address belonging to a subnet that is indicated by a client network address and a net mask in the address conversion table 207 (step S602). If there is no entry corresponding to the destination IP address (NO at step S602), the address conversion section 210 sends out a transmission request (step S606). If there exists such an entry (YES at step S602), the address conversion section 210 checks whether the source port number coincides with the port number in the entry (step S603).

If the source port number does not coincide with the port number in the entry (NO at step S603), the address conversion section 210 sends out a transmission request (step S606). If the source port number coincides with the port number in the entry (YES at step S603), the address conversion section 210 checks whether the source IP address coincides with the converted IP address (step S604). If the source IP address does not coincide with the converted IP address (NO at step S604), the address conversion section 210 sends out a transmission request (step S606). If the source IP address coincides with the converted IP address (YES at step S604), the address conversion section 210 rewrites the information that is held by the queue management section 209. Specifically, the address conversion section 210 updates the source IP address to the server IP address in the entry and updates an IP header check sum value and a TCP header check sum value in the data portion 403 (step S605). Finally, the address conversion section 210 sends a transmission request to the Ethernet packet processor 201 (step S606).

When receiving the transmission request, the Ethernet packet processor 201 reads the destination MAC address 401, the source MAC address 402, and the data portion 403 from the queue management section 209, assembles an Ethernet packet, and transmits it to the client side. The Ethernet packet processor 201 reads the remaining part of the data portion (the 89th and following bytes) from the packet memory 204 via the internal bus 202 and the memory controller 203, and sends it out.

The above address conversion makes it possible to distribute requests of clients to a plurality of servers on a subnet-by-subnet basis without the need for performing session management or preparing a special measure in the clients.

Although the above embodiment is directed to the case where the constituent apparatuses are connected to each other via an Ethernet, the invention can also be applied, as described below, to a case where the client side of the address conversion apparatus is an ATM network.

FIG. 7 shows the configuration of a second embodiment of the address converter 106 according to the invention. The configuration and the operation of this embodiment are approximately the same as those of the first embodiment shown in FIG. 2 and are different from the latter in that a PHY processor 701, an SAR processor 702, and an ARP processor 709 for processing an ATM cell are provided.

ATM cells are input from the client side. First, the PHY processor 701 extracts an ATM cell and transfers it to the SAR processor 702. The SAR processor 702 terminates the ATM cell and produces an AAL5 (ATM adaptation layer 5) packet. The SAR processor 702 transfers the data portion of the AAL5 packet to a packet memory 705 via an internal bus 703 and a memory controller 704. At this time, the first 88 bytes of the data portion are transferred to a queue management section 706 at the same time as they are transferred to the internal bus 703. This embodiment is different from the first embodiment in that there is no information of a source MAC address and a destination MAC address.

After completion of the transfer of one packet data to the packet memory 705, the SAR processor 702 transfers, to the queue management section 706, a packet memory address that indicates the storage start position of the data that has been stored in the packet memory 705 and its data length to the queue management section 706, and sends an address conversion section 707 a control signal indicating the end of storage.

When receiving the control signal, the address conversion section 707 performs address conversion on the information stored in the queue management section 706 in the above-described manner by referring to an address conversion table 708. However, this embodiment is different from the first embodiment shown in FIG. 2 that no MAC address rewriting operation is performed.

After completion of the address conversion, the address conversion section 707 sends a control signal to the ARP processor 709. The ARP processor 709 acquires a server-side MAC address from the destination IP address in the data portion that is stored in the queue management section 706. After the acquisition of the MAC address, an Ethernet packet processor 710 constructs an Ethernet packet and sends it to the server side.

An Ethernet packet that is input from the server side is terminated by the Ethernet packet processor 710. The operations of the Ethernet packet processor 710 and a queue management section 711 are the same as those of the Ethernet packet processor 208 and the queue management section 209 of the first embodiment shown in FIG. 2.

An address conversion section 712 executes the process of FIG. 6 on the information stored in the queue management section 711 by referring to the address conversion table 708. After completion of the process, the address conversion section 712 sends a transmission request signal to the SAR processor 702.

When receiving the transmission request, the SAR processor 702 reads the data portion from the queue management section 711, constructs an AAL5 packet, and sends it, as an ATM cell, to the client side via the PHY processor 701. The SAR processor 702 reads the 89th and following bytes of the data portion from the packet memory 705 via the internal bus 703 and the memory controller 704.

Also in the case where the client side is an ATM network, the above address conversion makes it possible to allocate requests of clients to a plurality of servers on a subnet-by-subnet basis without the need for performing session management or preparing the special measure in the clients.

As described above, in the invention, the addresses of clients are classified in advance and address conversion is performed for each classification item. This makes it possible to allocate requests of clients to a plurality of servers without the need for performing session management or preparing a special measure in the clients. An advantage is provided that the load of each server can be reduced in a case where servers perform the same service.

Since requests from clients are distributed to a plurality of servers by classifying the addresses of clients in advance, even existing server that are not of high performance can easily be utilized effectively and systems can be constructed at low costs.

Where the invention is applied to a case where servers perform different services, an operation is enabled in which it appears to a client as if one server is performing all services. This provides an advantage that in altering or extending the configuration of servers, it is not necessary to change the settings of clients.

Further, in contrast to a method in which TCP sessions between clients and servers are monitored and managed by an address converter and loads are dispersed by distributing requests of clients to a plurality of servers, in the method of the invention the address converter need not manage sessions. Therefore, the process and the implementation are made easier and hence hardware can be constructed more easily, which provides an advantage that the processing speed can be made so much higher.

What is claimed is:

1. A method for distributing service requests from a plurality of clients to a plurality of servers, comprising the steps of:
   classifying, in advance, addresses of the clients into a plurality of address groups;
   correlating each of the plurality of address groups with one of the plurality of servers; and
   sending a service request of a client to the server corresponding to the address group of the client.

2. The method according to claim 1, wherein a single service is provided by the plurality of servers.

3. The method according to claim 1, wherein different services are provided by the plurality of servers.

4. The method according to claim 1, wherein a service request is received from a client through Ethernet network and is sent to a corresponding server through Ethernet network.

5. A method for distributing service requests from a plurality of clients to a plurality of servers, comprising the steps of:
   classifying, in advance, addresses of the clients into a plurality of address groups;
   correlating each of the plurality of address groups, a kind of service, and one of the plurality of servers with each other; and
   sending a service request of a client to the server corresponding to the address group of the client and a kind of a service that is requested by the client.

6. The method according to claim 5, wherein a single service is provided by the plurality of servers.

7. The method according to claim 5, wherein different services are provided by the plurality of servers.

8. The method according to claim 5, wherein a service request is received from a client through ATM network and is sent to a corresponding server through an Ethernet network.

9. An address converter for distributing service requests from a plurality of clients to a plurality of servers, comprising:
   an address conversion table retrievably storing addresses of the plurality of clients, which are classified into a plurality of address groups, wherein each of the plurality of address groups is correlated with one of the plurality of servers; and
   a controller for sending a service request of a client to the server corresponding to the address group of the client as determined by referring to the address conversion table, in order to provide a requested service to the client.

10. The address converter according to claim 9, wherein a single service is provided by the plurality of servers.

11. The address converter according to claim 9, wherein different services are provided by the plurality of servers.

12. The address converter according to claim 9, wherein a service request is received from a client through Ethernet network and is sent to a corresponding server through Ethernet network.

13. An address converter for distributing service requests from a plurality of clients to a plurality of servers, comprising:
   an address conversion table retrievably storing addresses of the plurality of clients, which are classified into a plurality of address groups, wherein each of the plurality of address groups, a kind of service, and one of the plurality of servers are correlated with each other; and
   a controller for sending a service request of a client to the server corresponding to the address group of the client and the kind of service that is requested by the client, as determined by referring to the address conversion table, in order to provide a requested service to the client.

14. The address converter according to claim 13, wherein a single service is provided by the plurality of servers.

15. The address converter according to claim 13, wherein different services are provided by the plurality of servers.

16. The address converter according to claim 13, wherein a service request is received from a client through ATM network and is sent to a corresponding server through an Ethernet network.

17. A method for distributing service requests from a plurality of clients to a plurality of servers, comprising the steps of:
   classifying, in advance, addresses of the clients into a plurality of address groups; correlating each of the plurality of address groups with one of the plurality of servers;
   converting one or more addresses of a destination server of a service request from a requesting client into one or more addresses of a different server, which provides the requested service, based on the address group of the requesting client; and
   sending the service request of the requesting client to the different server corresponding to the address group of the requesting client, using the converted one or more addresses.

* * * * *